United States Patent
Sato et al.

(10) Patent No.: US 8,141,673 B2
(45) Date of Patent: Mar. 27, 2012

(54) ENGINE FOR SADDLE RIDE TYPE VEHICLE

(75) Inventors: Toshiyuki Sato, Saitama (JP); Masako Takahashi, Saitama (JP); Hiromi Sumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1280 days.

(21) Appl. No.: 11/729,806

(22) Filed: Mar. 30, 2007

(65) Prior Publication Data

US 2007/0245999 A1    Oct. 25, 2007

(30) Foreign Application Priority Data

Mar. 31, 2006  (JP) ................... 2006-098199
Mar. 31, 2006  (JP) ................... 2006-098200

(51) Int. Cl.
*B60K 5/04* (2006.01)

(52) U.S. Cl. ........... 180/291; 74/606 R; 123/195 A; 123/198 R

(58) Field of Classification Search ........... 180/291, 180/292; 74/606 R; 123/195 A, 198 R, 197.1, 123/195 R, 198 P, 196 CP
See application file for complete search history.

(56) References Cited

U.S. PATENT DOCUMENTS

| | | | |
|---|---|---|---|
| 4,719,819 A * | 1/1988 | Tsutsumikoshi et al. | 74/745 |
| 4,795,420 A * | 1/1989 | Sakurai et al. | 60/313 |
| 6,557,516 B2 * | 5/2003 | Tsutsumikoshi | 123/196 R |
| 6,923,091 B2 * | 8/2005 | Hori et al. | 74/606 R |
| 7,096,753 B2 * | 8/2006 | Kawakubo et al. | 74/337.5 |
| 7,284,523 B2 * | 10/2007 | Fukuzawa et al. | 123/179.25 |
| 7,367,328 B2 * | 5/2008 | Matsuda | 123/572 |
| 7,455,039 B2 * | 11/2008 | Nakayama | 123/90.31 |
| 2008/0021621 A1 | 1/2008 | Kosugi | |

FOREIGN PATENT DOCUMENTS

| | | | |
|---|---|---|---|
| JP | 60179337 A | * | 9/1985 |
| JP | 2000-282884 A | | 10/2000 |
| JP | 2001-140668 A | | 5/2001 |
| JP | 2003-90260 A | | 3/2003 |
| WO | WO 2006/004008 A1 | | 1/2006 |

* cited by examiner

*Primary Examiner* — John Walters
(74) *Attorney, Agent, or Firm* — Birch, Stewart, Kolasch & Birch, LLP

(57) ABSTRACT

An engine for vehicle includes an oil hydraulic automatic transmission for changing the change gear ratio by control of an oil pressure. The oil pressure control unit of the transmission includes a plurality of control valves for controlling the oil pressure, and is mounted to an upper portion of a crankcase. A power transmission shaft interlockedly connected to a counter shaft and having an axis parallel to the counter shaft is disposed on the lower rear side of the counter shaft, and a drive bevel gear on the power transmission shaft and a driven bevel gear are meshed with each other on the rear side of the axis of the power transmission shaft. The resulting configuration eliminates the need for a special measure to protect the oil pressure control unit, and prevents interference of the driven bevel gear with the gear speed change mechanism.

13 Claims, 8 Drawing Sheets

ENGINE FOR SADDLE RIDE TYPE VEHICLE

CROSS-REFERENCE TO RELATED APPLICATION

The present application claims priority under 35 U.S.C. §119 to Japanese Patent Application No. 2006-098199, filed Mar. 31, 2006, and Japanese Patent Application No. 2006-098200, filed Mar. 31, 2006, the entire contents of which are hereby incorporated by reference.

BACKGROUND OF THE INVENTION

1. Field of the Invention

The present invention relates to an engine for a vehicle having a saddle, mounted on the vehicle in such a manner that an oil hydraulic automatic transmission for changing over the change gear ratio by control an oil pressure is incorporated in an engine body.

In addition, the present invention relates to a power transmission device for the vehicle, wherein a gear speed change mechanism included of a plurality of speed-stage gear train capable of being alternatively established between main shafts and a counter shaft, which extend in parallel to the vehicle width direction, is incorporated in an engine body mounted on the vehicle, and a drive bevel gear interlockedly connected to the counter shaft and a driven bevel gear fixed to a front and rear wheel drive shaft disposed in the vicinity of the center of the engine body along the vehicle width direction and extending in the front-rear direction of the vehicle are meshed with each other in the engine body.

2. Description of Background Art

A configuration in which an engine having an oil hydraulic automatic transmission is mounted on a vehicle having a saddle, and an oil pressure control unit having a plurality of control valves for controlling the oil pressure in the oil hydraulic automatic transmission, the control valves being stacked in a plurality of layers, is mounted onto a side surface of a crankcase of the engine has been known. For example, see Japanese Patent Laid-open No. 2003-90260.

However, in the configuration in which the oil pressure control unit is mounted on a side surface of the crankcase as disclosed in Japanese Patent Laid-open No. 2003-90260, there is a need for a measure for protecting the oil pressure control unit against scattered matters which may be scattered from the ground surface attendant on the running of the saddle ride type vehicle.

In addition, a power transmission device for a vehicle wherein a counter shaft in a gear speed change mechanism is disposed on the rear side of a crankshaft of an engine mounted on a saddle ride type vehicle and wherein a drive bevel gear fixed to the counter shaft and a driven bevel gear fixed to a front and rear wheel drive shaft are meshed with each other on the front side relative to the axis of the drive bevel gear, has been known. See for example, Japanese Patent Laid-open No. Sho 60-179337.

However, the driven bevel gear is large in diameter, in a configuration in which the drive bevel gear and the driven bevel gear are meshed with each other on the front side relative to the axis of the drive bevel gear as in the configuration disclosed in Japanese Patent Laid-open No. Sho 60-179337. Therefore, in order to prevent the driven bevel gear from interfering with speed change gears in the gear speed change mechanism, it is necessary to secure a sufficient vacant space, to obviate the arrangement of speed change gears in the area corresponding to the driven bevel gear, and/or to arrange a speed change gear with a sufficiently small diameter in the area corresponding to the driven bevel gear. As a result, the degree of freedom in laying out the speed change gears is reduced, and the engine body would be enlarged in size.

SUMMARY AND OBJECTS OF THE INVENTION

The present invention has been made in consideration of the above-mentioned circumstances. Accordingly, it is an object of the present invention to provide an engine for a vehicle having a saddle in which it is unnecessary to take a special measure for protection of an oil pressure control unit. In addition, another object of the present invention is to provide a power transmission device for a vehicle such that the interference of a driven bevel gear with a gear speed change mechanism can be obviated, while obviating an increase in the size of an engine body and enhancing the degree of freedom in laying out the component parts of the gear speed change mechanism.

According to a first aspect of the present invention, an engine for a saddle ride type vehicle includes an oil hydraulic automatic transmission for changing over the change gear ratio by control of an oil pressure, and the oil hydraulic automatic transmission is incorporated in an engine body mounted on the saddle ride type vehicle. An oil pressure control unit included of a plurality of control valves for controlling the oil pressure in the oil hydraulic automatic transmission is mounted to an upper part of a crankcase constituting a part of the engine body.

According to a second aspect of the present invention, the engine body is mounted on the saddle ride type vehicle with its cylinder axis inclined, and the oil pressure control unit is mounted to an upper part of the crankcase on the opposite side of the inclination direction of the cylinder axis.

According to a third aspect of the present invention, the oil pressure control unit, including electrically controlled control valves, and other electrical equipments are concentratedly arranged at an upper part on one side of the crankcase, and exhaust pipes are disposed on the outer side on the other side of the engine body.

According to a fourth aspect of the present invention, the crankcase has an upper case half and a lower case half coupled to each other so as to be splittable into upper and lower parts.

According to a fifth aspect of the present invention, the oil pressure control unit has the plurality of control valves stacked in a plurality of layers in the vertical direction.

Incidentally, the starter motor 47 and the shift motor 80 in the embodiment described later correspond to the electrical equipments in the present invention.

According to a sixth aspect of the present invention, a power transmission device for a vehicle, includes a gear speed change mechanism having a plurality of speed-stage gear trains capable of being alternatively established between main shafts and a counter shaft which extend in parallel to the vehicle width direction. The gear speed change mechanism is incorporated in an engine body mounted on the vehicle, a drive bevel gear is interlockedly connected to the counter shaft, and a driven bevel gear is fixed to a front and rear wheel drive shaft disposed in the vicinity of the center of the engine body along the vehicle width direction and extending in the front-rear direction of the vehicle. In addition, the drive bevel gear and the driven bevel gear are meshed with each other in the engine body. A power transmission shaft interlockedly connected to the counter shaft and having an axis parallel to the counter shaft is disposed on the lower rear side of the counter shaft. Further, the drive bevel gear provided on the power transmission shaft and the driven bevel gear are meshed with each other on the rear side of the axis of the power transmission shaft.

According to the seventh aspect of the present invention, a front part of the front and rear wheel drive shaft inserted into the engine body forwards from the rear end of the engine body along the front-rear direction of the vehicle and penetrating the engine body is rotatably mounted on the front end of the engine body along the front-rear direction through a first bearing. A bearing retaining member penetrated by a rear part of the front and rear wheel drive shaft is detachably attached to the engine body. The driven bevel gear relatively non-rotatably fitted to the front and rear wheel drive shaft from the rear end of the front and rear wheel drive shaft is clamped between a second bearing, which is retained by the bearing retaining member so as to be interposed between the front and rear wheel drive shaft and the bearing retaining member, and a ring-like receiving step part provided at the outer periphery of the front and rear wheel drive shaft.

In addition, according to an eighth aspect of the present invention, the gear speed change mechanism includes the reverse gear train having reverse idle gears provided at intermediate portions of a transmission path between the main shaft and the counter shaft, and the axes of rotation of the reverse idle gears are disposed on the front side relative to the power transmission shaft.

Incidentally, the ball bearing 89 in the embodiment described later corresponds to the first bearing in the present invention, and the ball bearing 92 in the embodiment corresponding to the second bearing in the invention.

EFFECTS OF THE INVENTION

According to the first aspect of the present invention, the oil pressure control unit is mounted to an upper part of the crankcase, so that scattered matters scattered from the ground surface attendant on the running of the saddle ride type vehicle are prevented from colliding against the oil pressure control unit by the crankcase, and there is no need for a special measure for protection of the oil pressure control unit.

According to the second aspect of the present invention, the oil pressure control unit is disposed on the opposite side of the inclination direction of the cylinder axis, whereby the influence of heat radiation from the cylinder block side can be prevented from being exerted on the oil pressure control unit.

According to the third aspect of the present invention, the oil pressure control unit, including the electrically controlled control valves, and other electrical equipments are concentratedly arranged at an upper part on one side of the crankcase, whereby it is possible to contrive concentration and simplification of wiring and a reduction in weight. Moreover, since the exhaust pipes are arranged on the outer side on the other side of the engine body, the influence of heat radiation from the exhaust pipes can be prevented from being exerted on the oil pressure control unit and the other electrical equipments.

According to the fourth aspect of the present invention, the crankcase is so configured as to be splittable into upper and lower parts, so that the oil pressure control unit can be mounted stably to the upper case half, without being limited by the split surface of the crankcase.

According to the fifth aspect of the present invention, the oil pressure control unit having the plurality of control valves stacked in a plurality of layers in the vertical direction is mounted to an upper part of the crankcase, so that the oil pressure control unit can be mounted to an upper part of the crankcase in the manner of mounting the layers sequentially from the lower to the upper layers, and the mountability of the oil pressure control unit onto the crankcase can be enhanced.

According to the sixth aspect of the invention, the drive bevel gear is provided on the power transmission shaft interlockedly connected to the counter shaft in the gear speed change mechanism and disposed on the lower rear side of the counter shaft while having an axis parallel to the counter shaft, and the driven bevel gear fixed to the front and rear wheel drive shaft is meshed with the drive bevel gear on the rear side relative to the axis of the power transmission shaft. Therefore, the interference of the driven bevel gear with the gear speed change mechanism can be obviated, while obviating an increase in the size of the engine body and enhancing the degree of freedom in laying out the component parts of the gear speed change mechanism.

According to the seventh aspect of the invention, the front and rear wheel drive shaft is inserted into the engine body from the rear side so as to penetrate the engine body, and the drive bevel gear relatively non-rotatably fitted to the front and rear wheel drive shaft from the rear end of the latter is clamped between the bearing, which is retained by the bearing retaining member detachably attached to the engine body so as to be interposed between the front and rear wheel drive shaft and the bearing retaining member, and the ring-like receiving step part provided at the outer periphery of the front and rear wheel drive shaft. Therefore, after the front and rear wheel drive shaft is inserted into the engine body, the driven bevel gear can be easily mounted onto the front and rear wheel drive shaft.

According to the eighth aspect of the invention, the reverse idle gears of the reverse gear train belonging to the gear speed change mechanism are disposed on the front side relative to the power transmission shaft to which the drive bevel gear is fixed. Therefore, the interference of the driven bevel gear with the reverse idle gears can be easily obviated, without making any special contrivance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
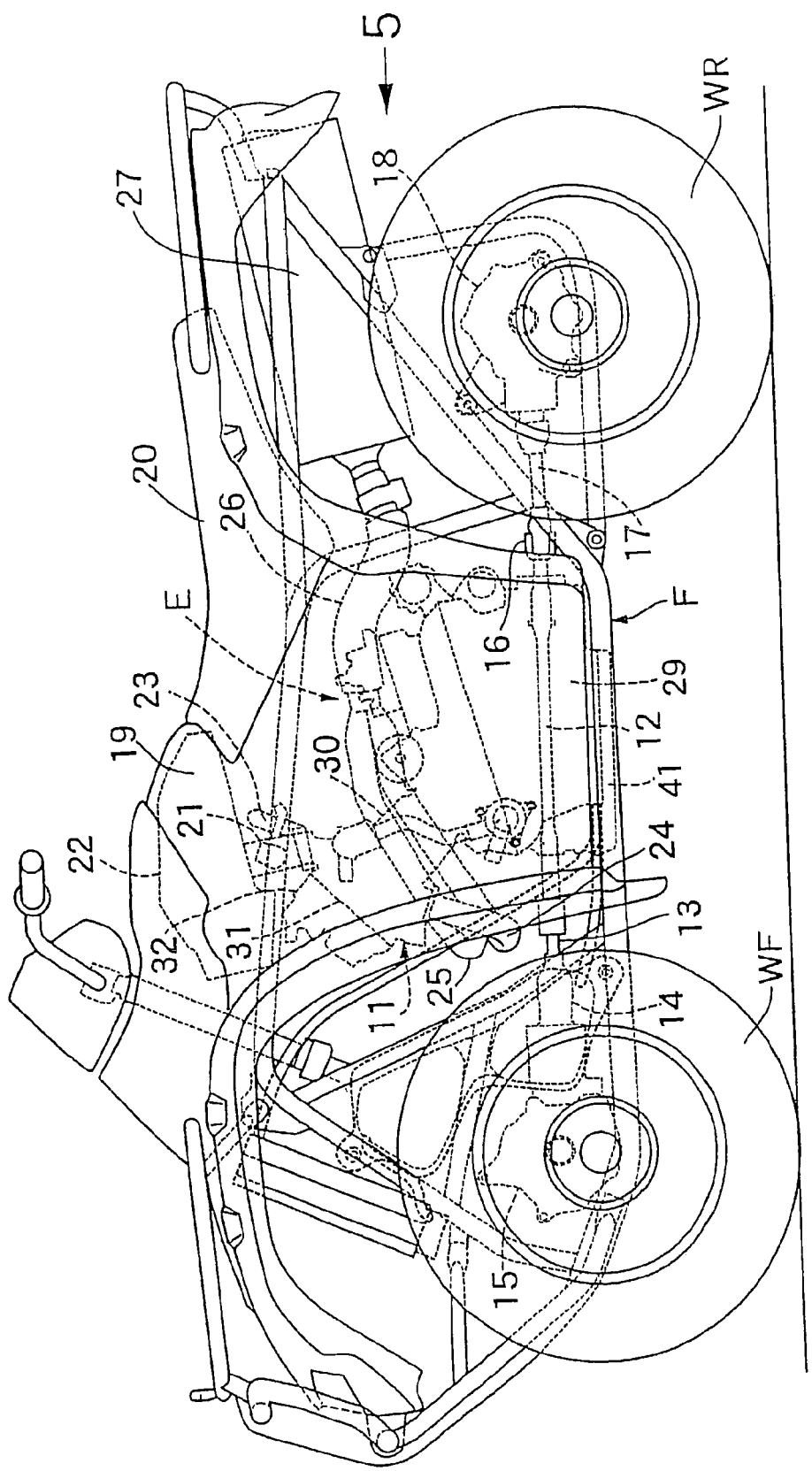
FIG. 1 is a side view of a saddle ride type vehicle.
Figure 2:
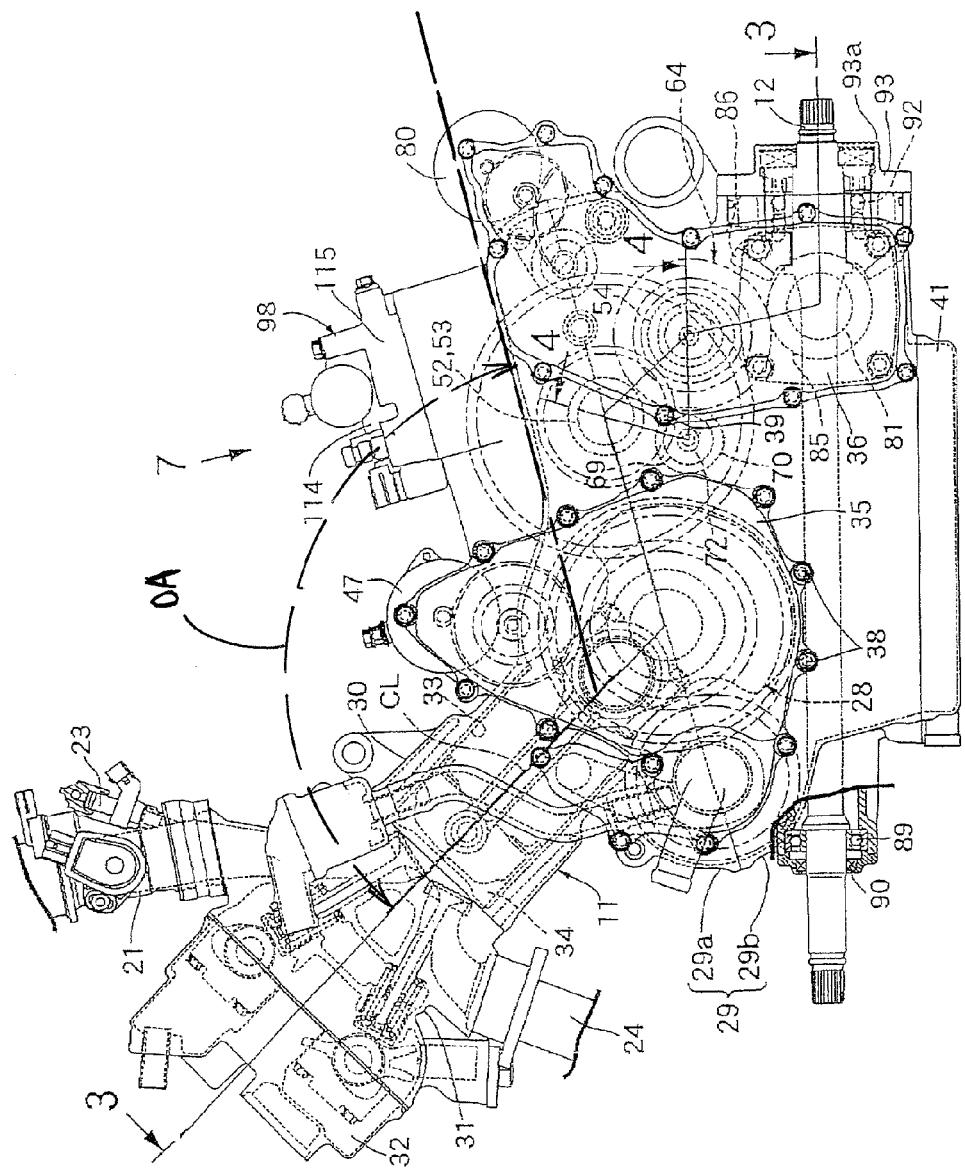
FIG. 2 is a side view of an engine body.
Figure 3:
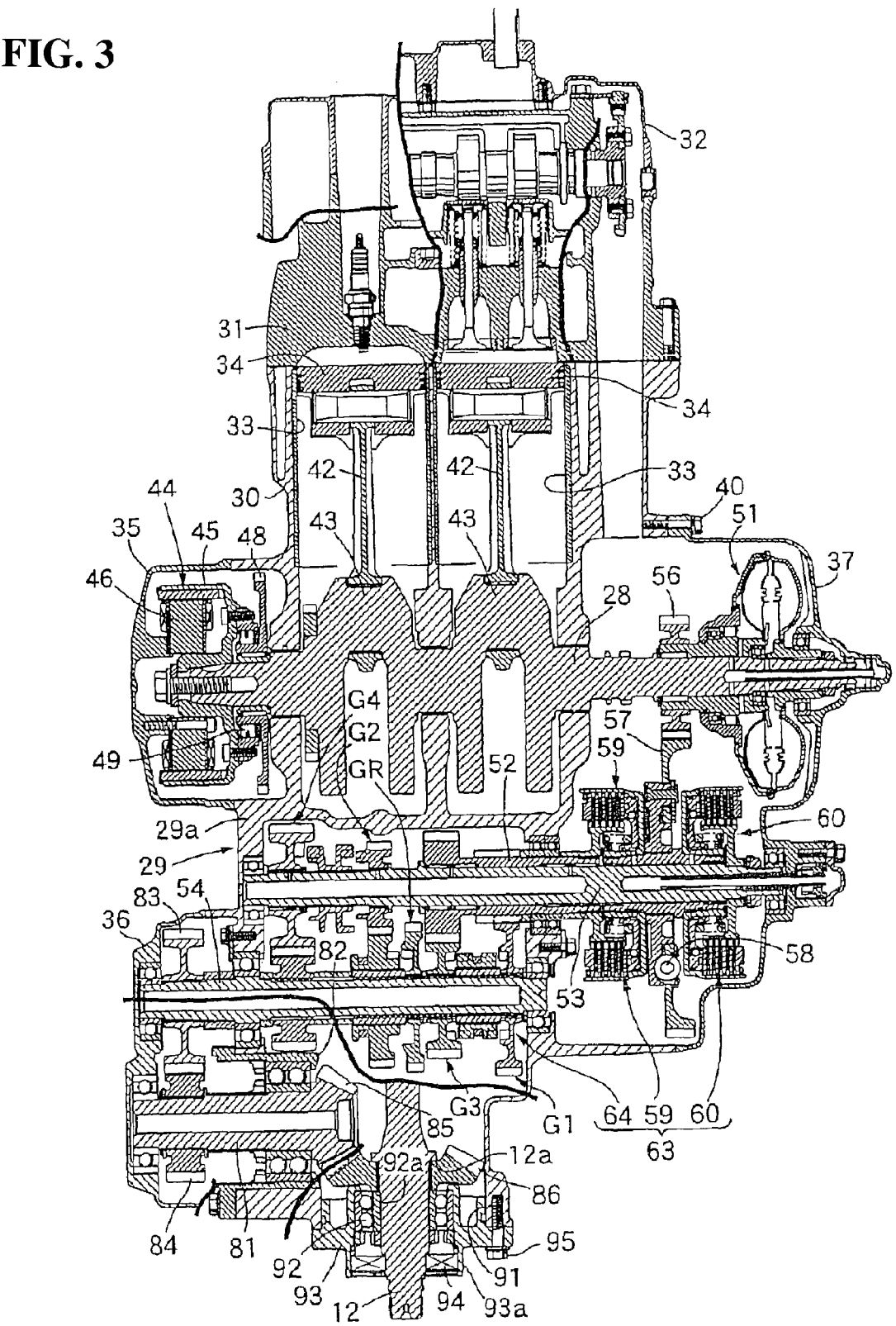
FIG. 3 is a sectional view taken along line 3-3 of FIG. 2.
Figure 4:
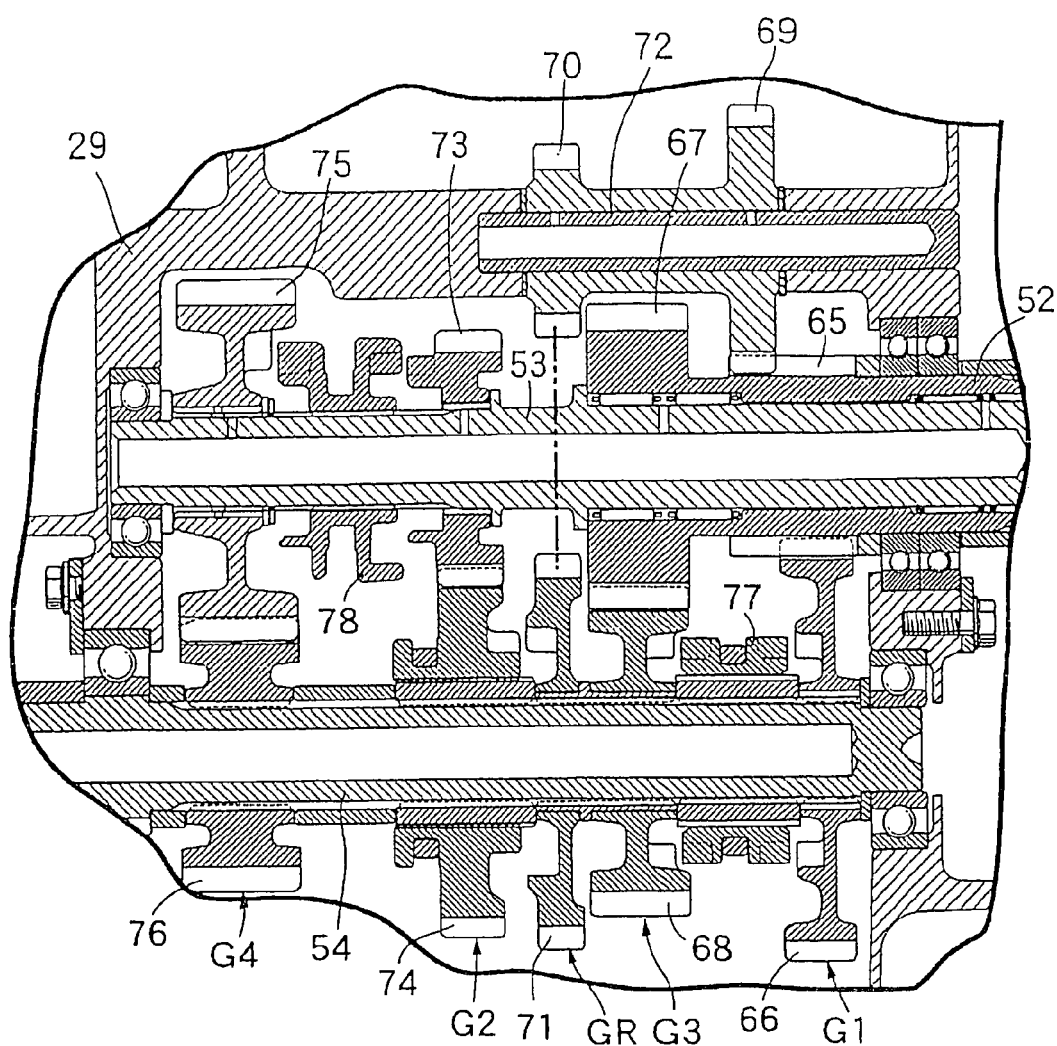
FIG. 4 is a sectional view taken along line 4-4 of FIG. 2.
Figure 5:
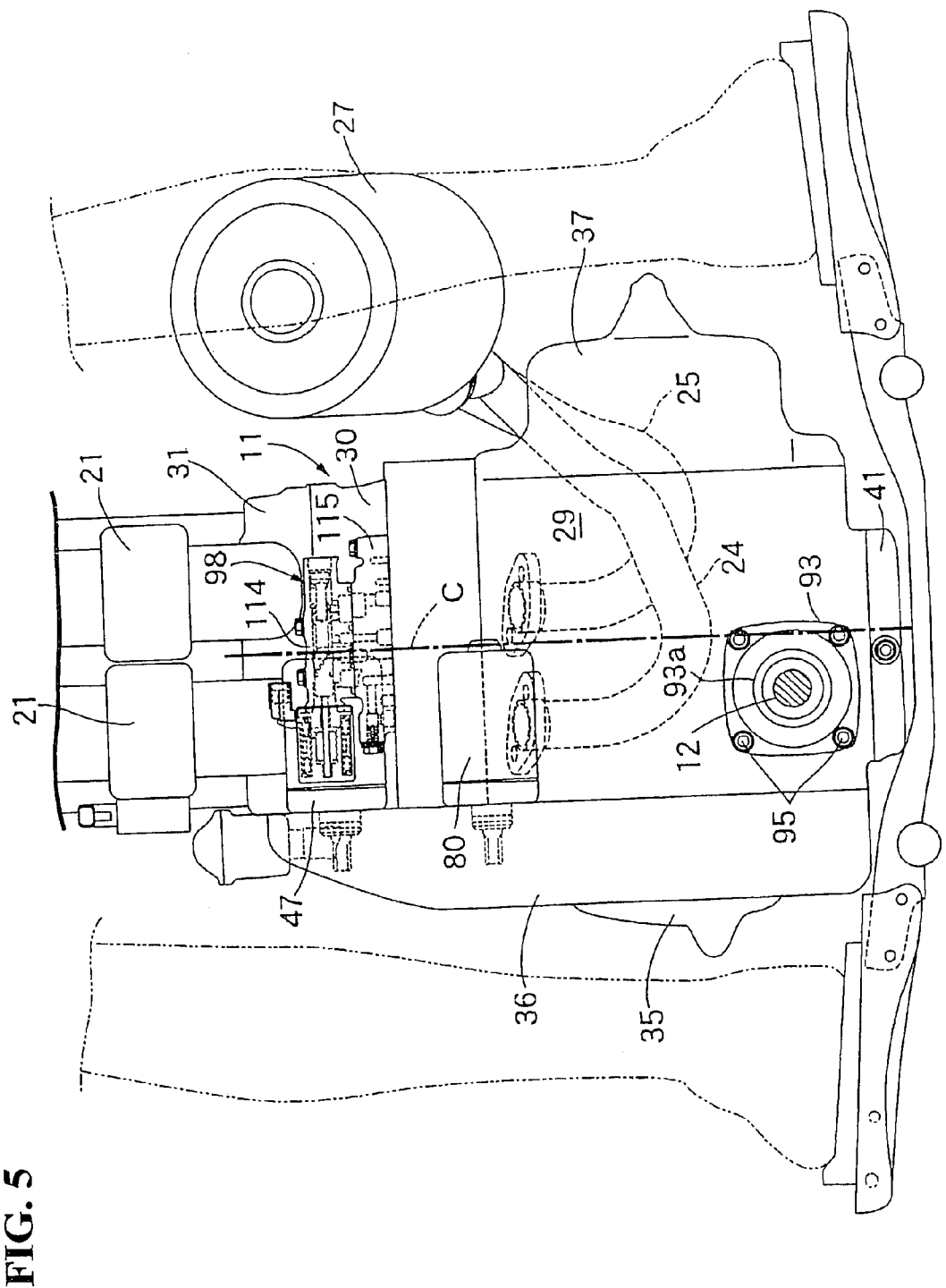
FIG. 5 is a view taken along arrow 5 of FIG. 1.
Figure 6:
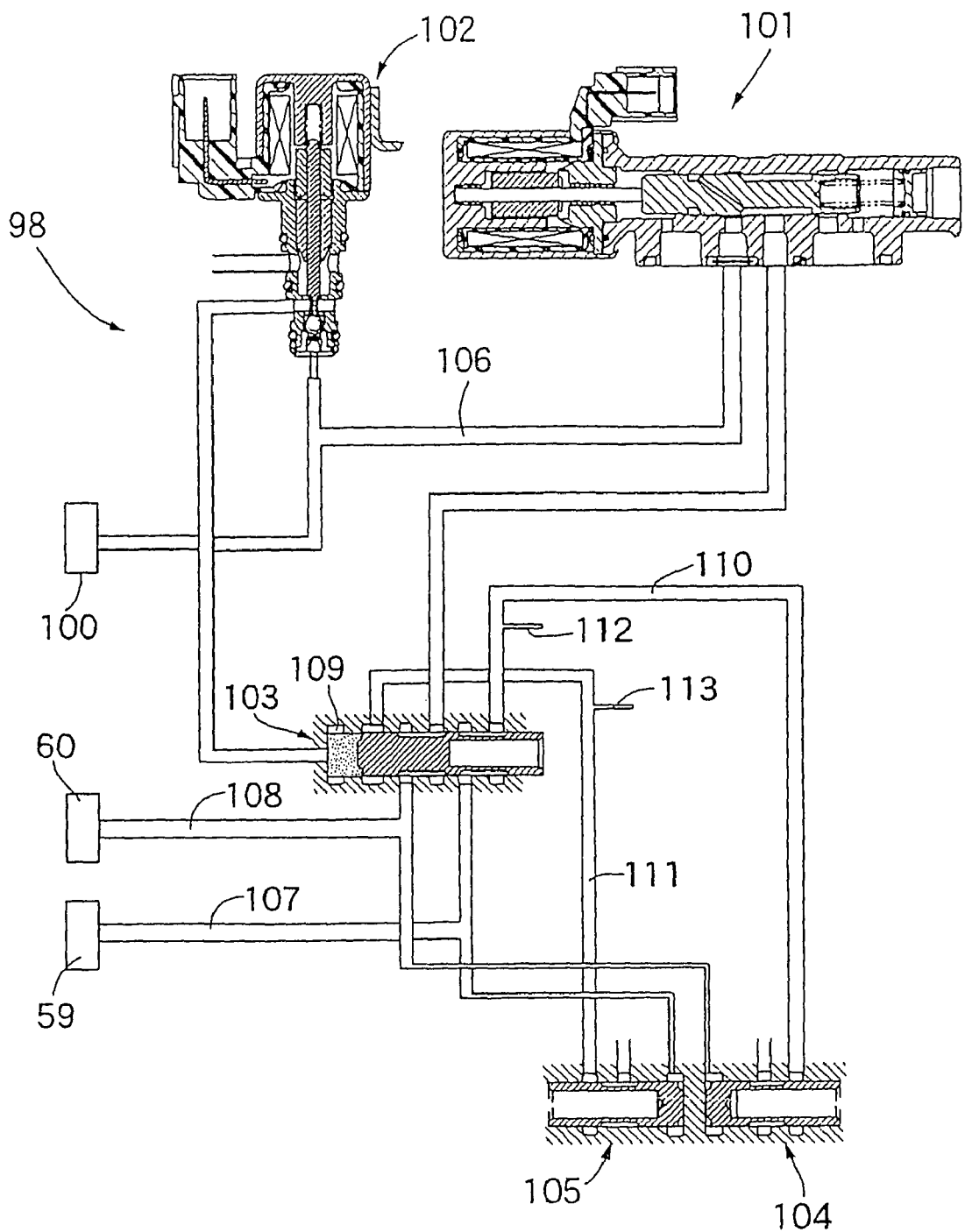
FIG. 6 is a circuit diagram showing the configuration of an oil pressure control unit.
Figure 7:
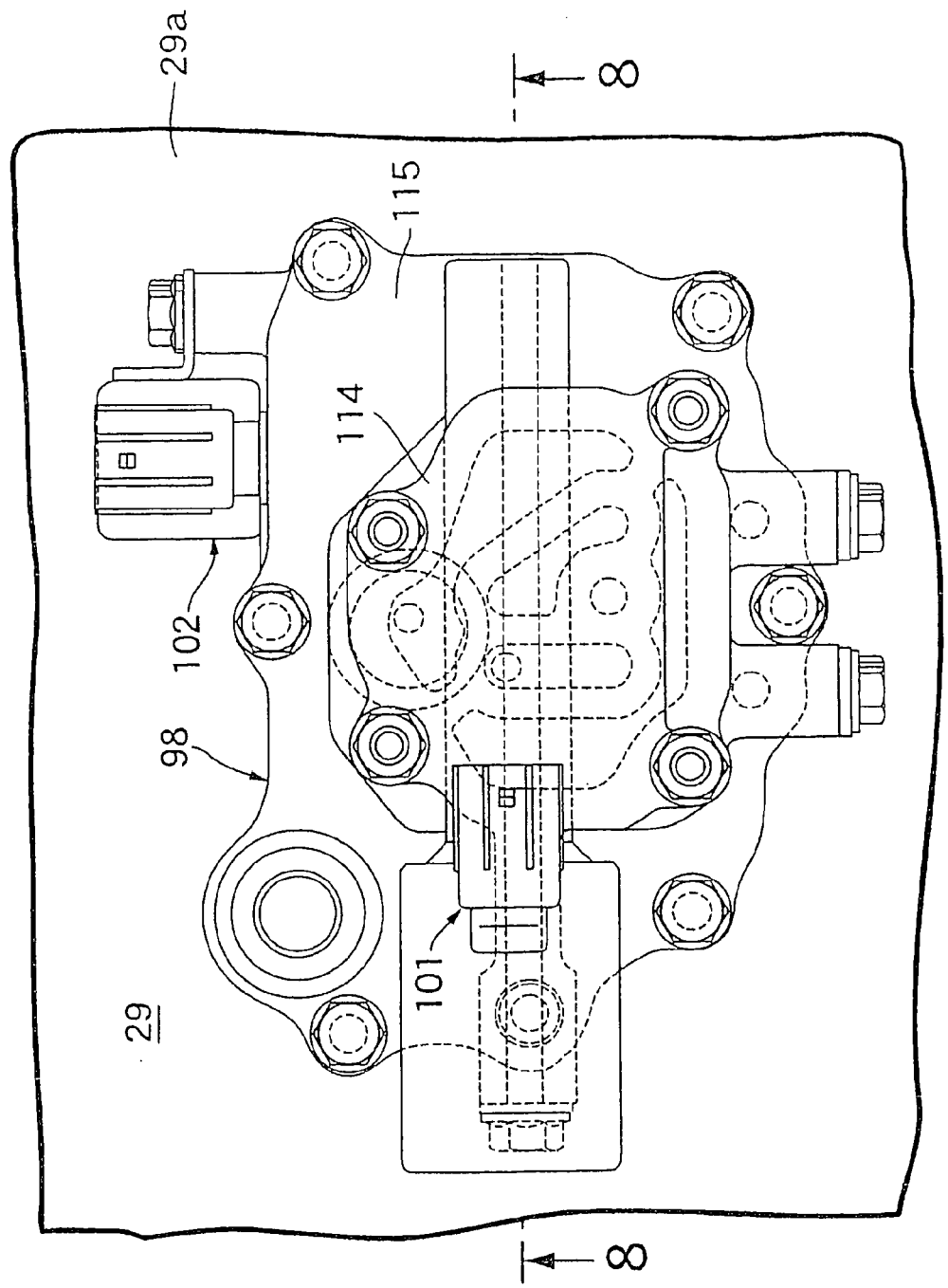
FIG. 7 is a view taken along arrow 7 of FIG. 2.
Figure 8:
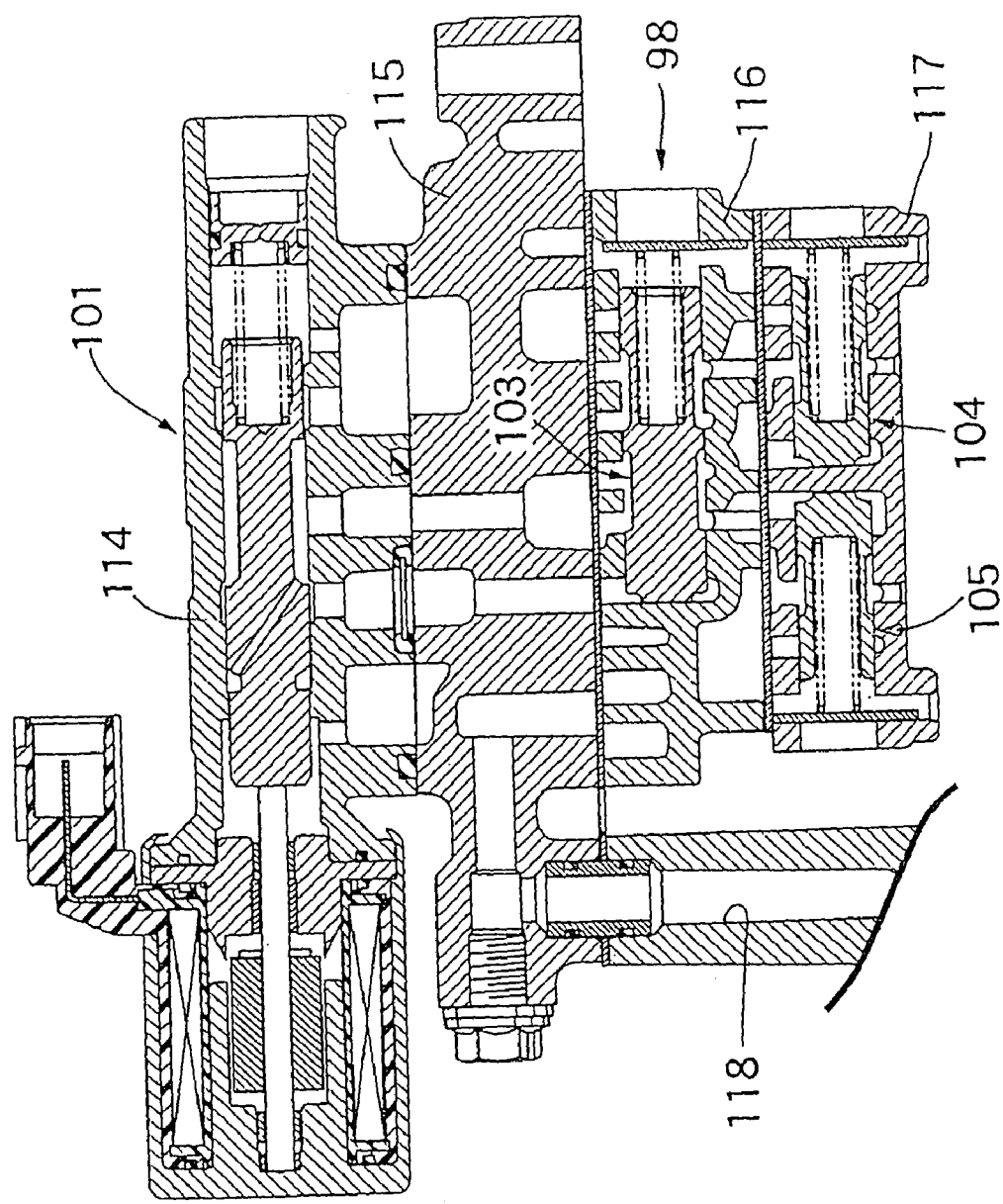
FIG. 8 is a sectional view taken along line 8-8 of FIG. 7.

FIGS. 1 to 8 show one embodiment of the present invention, in which FIG. 1 is a side view of a saddle ride type vehicle, FIG. 2 is a side view of an engine body, FIG. 3 is a sectional view taken along line 3-3 of FIG. 2, FIG. 4 is a sectional view taken along line 4-4 of FIG. 2, FIG. 5 is a view taken along arrow 5 of FIG. 1, FIG. 6 is a circuit diagram showing the configuration of an oil pressure control unit, FIG. 7 is a view taken along arrow 7 of FIG. 2, and FIG. 8 is a sectional view taken along line 8-8 of FIG. 7.

First, in FIG. 1, a left-right pair of front wheel WF are suspended at front portions of a vehicle body frame F of a saddle ride type vehicle used as an all-terrain vehicle, and a left-right pair of rear wheels WR are suspended at rear portions of the vehicle body frame F. An engine body 11 of, for example, a two-cylinder engine E is mounted on the vehicle body frame F between both the front wheels WF and both the rear wheels WR; a front and rear wheel drive shaft 12 for transmitting the power from the engine E to both the front wheels WF and both the rear wheels WR is disposed to penetrate a lower portion of the engine body 11, with its axis set along the front-rear direction of the vehicle body frame F; the power outputted from the front end of the front and rear wheel drive shaft 12 is transmitted through a front wheel drive shaft 13, a universal joint 14 and a front differential gear 15 to both the front wheels WF; and the power outputted from the rear end of the front and rear wheel drive shaft 12 is transmitted through a universal joint 16, a rear wheel drive shaft 17 and a rear differential gear 18 to both the rear wheels WR.

A vehicle body cover 19 covering a most part of the vehicle body frame F and the engine E is mounted to the vehicle body frame F, and a rider's seat 20 is provided on the vehicle body cover 19. In addition, throttle bodies 21 provided on the basis of each cylinder are connected to a rear side wall of a cylinder head 31 in the engine body 11, and the upstream ends of both the throttle bodies 21 are connected in common to an air cleaner 22 disposed on the upper side of the engine body 11 and on the front side of the rider's seat 20 and covered by the vehicle body cover 19. Moreover, fuel injection valves 23 are annexed to both the throttle bodies 21. On the other hand, the upstream ends of exhaust pipes 24 and 25 provided on the basis of each cylinder are connected to a front side wall of the cylinder head 31, and the exhaust pipes 24 and 25 are formed to be curved so as to pass on the right side of the engine body 11 as viewed from a person facing forwards with respect to the running direction of the saddle ride type vehicle. The downstream ends of both the exhaust pipes 24 and 25 are connected to an exhaust muffler 27 through a common exhaust pipe 26 common for the exhaust pipes 24, 25, and the exhaust muffler 27 is disposed on the rear side of the engine body 11.

In FIGS. 2 and 3, the engine body 11 includes a crankcase 29 rotatably bearing thereon a crankshaft 28 having an axis set along the vehicle width direction (the direction perpendicular to the sheet surface of FIG. 2), a cylinder block 30 connected to an upper part of the crankcase 29, the cylinder head 31 connected to an upper part of the cylinder block 30, and a head cover 32 connected to an upper part of the cylinder head 31. Pistons 34, 34 slidably fitted in a pair of cylinder bores 33, 33 provided in the cylinder block 30 are connected to a crankshaft 28 through connecting rods 42, 42 and crank pins 43, 43. Moreover, the axes of both the cylinder bores 34 and, hence, the cylinder axis CL is inclined to be directed forwardly upwards in the condition where the engine body 11 is mounted on the saddle ride type vehicle.

The crankcase 29 has upper and lower case halves 29a and 29b coupled to each other at a plane orthogonal to the axis of rotation of the crankshaft 28, and the cylinder block 30 and the upper case half 29a are formed as one body. In addition, first and second crankcase covers 35 and 36 are fastened to the left side of the crankcase 29, as viewed from a person facing forwards with respect to the running direction of the saddle ride type vehicle, respectively by pluralities of bolts 38 and 39 (see FIG. 2); on the other hand, a third crankcase cover 37 is fastened to the right side of the crankcase 29, as viewed from a person facing forwards with respect to the running direction of the saddle ride type vehicle, by a plurality of bolts 40 (see FIG. 3). Besides, an oil pan 41 is fastened to a lower portion of the crankcase 29. As can be seen in FIG. 2, an oil pressure control unit 98 is mounted to a rear portion of an upper surface of the upper case half 29a of the crankcase 29 in a position that is directly behind the cylinder block 30 inclined toward the front of the vehicle, the upper surface of the upper case half 29a is arranged at an obtuse angle (OA) relative to the cylinder axis (CL), and the rear portion of the upper case half 29a is higher than a forward portion of the upper case half 29a.

A generator 44 is contained between the first crankcase cover 35 and the crankcase 29. An outer rotor 45 of the generator 44 is fixed to one end of the crankshaft 28 which rotatably penetrates a left side wall of the crankcase 29, and an inner stator 46 of the generator 44 is fixed to the first crankcase cover 35.

In addition, a starter motor 47 is attached to an upper portion of the crankcase 29, as shown in FIG. 2, and a gear 48 to which power is transmitted from the starter motor 47 is connected to the outer rotor 45 through a one-way clutch 49.

The other end of the crankshaft 28 which rotatably penetrates a right side wall of the crankcase 29 is rotatably borne on the third crankcase cover 37, and a torque converter 51 is mounted to the other end part of the crankshaft 28.

A first main shaft 52 having an axis parallel to the crankshaft 28 is rotatably borne on the crankcase 29 on the rear side of the crankshaft 28. Both ends of a second main shaft 53 coaxially penetrating the first main shaft 52 so that they can rotate relative to each other are rotatably borne on the crankcase 29 and the third crankcase cover 37. Moreover, the axis of the first and second main shafts 52, 53 is disposed on the split plane of the crankcase 29, i.e., on the coupling plane of the upper and lower case halves 29a, 29b. In addition, a counter shaft 54 having an axis parallel to the first and second main shafts 52, 53 is disposed on the rear lower side of the first and second main shafts 52, 53, and the counter shaft 54 is rotatably borne on the second crankcase cover 36 and the crankcase 29.

A power transmission tubular shaft 55 is relatively rotatably mounted onto the first main shaft 52 between the crankcase 29 and the third crankcase cover 37. Rotational power from the crankshaft 28 is transmitted to the power transmission tubular shaft 55 through the torque converter 51, a drive gear 56 connected to the crankshaft 28 through the torque converter 51, a driven gear 57 meshed with the drive gear 56, and a damper spring 58. Besides, a first hydraulic clutch 59 put into a connection state according to the action of an oil pressure is provided between the power transmission tubular shaft 55 and the first main shaft 52. A second hydraulic clutch 60, so disposed that the driven gear 57 is located between itself and the first hydraulic clutch 59, is provided between the power transmission tubular shaft 55 and the second main shaft 53 so that it is put into a connection condition according to the action of an oil pressure.

A gear speed change (transmission) mechanism 64 constituting an oil hydraulic automatic transmission 63 together with the first and second hydraulic clutches 59, 60 has a configuration in which a plurality of speed-stage gear trains capable of being alternatively established are provided between the first and second main shafts 52, 53 and the counter shaft 54. In this embodiment, a first speed gear train G1, a third speed gear train G3 and a reverse gear train GR are provided between the first main shaft 52 and the counter shaft 54, whereas a second speed gear train G2 and a fourth speed gear train G4 are provided between the second main shaft 53 and the counter shaft 54.

Referring to FIG. 4 also, the first speed gear train G1 is composed of a first speed drive gear 65 provided as one body with the first main shaft 52, and a first speed driven gear 66 relatively rotatably borne on the counter shaft 54, with its axial position fixed, and meshed with the first speed drive gear 65. The third speed gear train G3 is composed of a third speed drive gear 67 provided as one body with the first main shaft 52, and a third speed driven gear 68 relatively rotatably borne on the counter shaft 54, with its axial position fixed, and meshed with the third speed drive gear 67. The reverse gear train GR is composed of a first speed drive gear 65, a first reverse idle gear 69 meshed with the first speed drive gear 65, a second reverse idle gear 70 formed as one body with the first reverse idle gear 69, and a reverse driven gear 71 relatively rotatably borne on the counter shaft 54, with its axial position fixed, and meshed with the second reverse idle gear 70. The first and second reverse idle gears 69, 70 formed as one body are rotatably borne on a reverse idle shaft 72 which has an axis parallel to the first main shaft 52, the second main shaft 53 and the counter shaft 54 and both end portions of which are borne on the crankcase 29. Moreover, the axes of the first and second reverse idle gears 69, 70, i.e., the axis of the reverse idle gear 72 is disposed on the front side relative to the counter shaft 54, as shown in FIG. 2.

In addition, the second speed gear train G2 is composed of a second speed drive gear 73 relatively rotatably borne on the second main shaft 53, with its axial position fixed, and a second speed driven gear 74 which is borne on the counter shaft 54 so as to be capable of axial sliding within a limited range and be incapable of relative rotation and which is meshed with the second speed drive gear 73. The fourth speed gear train G4 is composed of a fourth speed drive gear 75 relatively rotatably borne on the second main shaft 53, with its axial position fixed, and a fourth driven gear 76 relatively rotatably borne on the counter shaft 54, with its axial position fixed, and meshed with the fourth speed drive gear 75.

A first shifter 77 is spline-connected to the counter shaft 54 between the first and third speed driven gears 66 and 68. The first shifter 77 is movable in the axial direction of the counter shaft 54 while being changed over to a position for engaging with the first speed driven gear 66 to establish the first speed gear train G1, a position for engaging with the third speed driven gear 68 to establish the third speed gear train G3, and an intermediate position for engagement with neither of the first and third speed driven gears 66 and 68. In addition, a second shifter 78 is spline-connected to the second main shaft 53 between the second speed drive gear 73 and the fourth speed drive gear 75. The second shifter 78 is movable in the axial direction of the second main shaft 53 while being changed over to a position for engaging with the second speed drive gear 73 to establish the second speed gear train G2, a position for engaging the fourth speed drive gear 75 to establish the fourth speed gear train G4, and an intermediate position for engagement with neither of the second and fourth speed drive gears 73 and 75. Furthermore, the second speed driven gear 74 of the second speed gear train G2 is movable in the axial direction between a position for engaging with the reverse driven gear 71 while maintaining the mesh with the second speed drive gear 73 and a position for disengagement from the reverse driven gear 71. The reverse gear train GR is established by moving the second speed driven gear 74 to a position for engagement with the reverse driven gear 71 under the condition where the second shifter 78 is in the internal position for engagement with neither of the second and fourth speed drive gear 73 and 75.

When the first hydraulic clutch 59 is in a power transmitting state and power is transmitted from the crankshaft 28 to the first main shaft 52, power is transmitted from the first main shaft 52 to the counter shaft 54 through an alternatively established one of the first speed gear train G1, the third speed gear train G3 and the reverse gear train GR. On the other hand, when the second hydraulic clutch 60 is in a power transmitting state and power is transmitted from the crankshaft 28 to the second main shaft 53, power is transmitted from the second main shaft 53 to the counter shaft 54 through an alternatively established one of the second speed gear train G2 and the fourth speed gear train G4.

Meanwhile, the power for driving the first shifter 77, the second shifter 78 and the second speed driven gear 74 is obtained by a shift motor 80 (see FIG. 2) attached to an upper portion of the crankcase 29.

As is clearly shown in FIG. 2, a power transmission shaft 81 having an axis parallel to the counter shaft 54 is disposed on the lower rear side of the counter shaft 54. The power transmission shaft 81 is rotatably borne by the second crankcase cover 36 and a support tube 82 attached to the crankcase 29. Moreover, a drive gear 83 fixed to the counter shaft 54 between the crankcase 29 and the second crankcase cover 36 is meshed with a driven gear 84 fixed to the power transmission shaft 81, whereby the power transmission shaft 81 is interlockedly connected to the counter shaft 54.

Referring to FIG. 5 also, the front and rear wheel drive shaft 12 penetrating a lower portion of the crankcase 29 of the engine body 11 in the front-rear direction is disposed in the vicinity of the center C of the engine body 11 along the vehicle width direction. A drive bevel gear 85 provided as one body with the power transmission shaft 81 is meshed with a driven bevel gear 86 fixed to the front and rear wheel drive shaft 12, on the rear side relative to the axis of the power transmission shaft 81.

Meanwhile, the front and rear wheel drive shaft 12 is inserted into the engine body 11 forwards from the rear end of the engine body 11, to penetrate the engine body 11. As shown in FIG. 2, a front portion of the front and rear wheel drive shaft 12 is borne on the crankcase 29 through a ball bearing 89, and a ring-like seal member 90 is interposed between the front and rear wheel drive shaft 12 and the crankcase 29 on the outer side of the ball bearing 89.

On the other hand, an opening part 91 greater than the driven bevel gear 86 in diameter is provided at the rear end of the crankcase 29 so as to permit insertion of the front and rear wheel drive shaft 12 therein. On the other hand, a bearing retaining member 93 having a hollow cylindrical part 93a for being penetrated by a rear portion of the front and rear wheel drive shaft 12 is fastened to the crankcase 29 by a plurality of bolts 95.

Moreover, the driven bevel gear 86 is fitted to the front and rear wheel drive shaft 12 from the rear end of the front and rear wheel drive shaft 12 so as to be incapable of relative rotation. The driven bevel gear 86 is clamped between an inner ring 92a of the ball bearing 92 retained by the retaining member 93 and a ring-like receiving step part 12a provided at the outer periphery of the front and rear wheel drive shaft 12 and fronting to the rear side. Furthermore, a ring-like seal member 94 is interposed between the hollow cylindrical part 93a of the bearing retaining member 93 and the front and rear wheel drive shaft 12, on the outer side of the ball bearing 92.

In FIG. 6, the oil pressures at the first and second hydraulic clutches 59, 60 in the oil hydraulic automatic transmission 63 are controlled by an oil pressure control unit 98 including a plurality of control valves inclusive of electrically controlled control valves. In this embodiment, the oil pressure control unit 98 includes first to fifth control valves 101, 102, 103, 104 and 105.

The first control valve 101 provided at an intermediate portion of a common oil passage 106 communicating with an oil pressure source 100 is a linear solenoid valve for moderating a rise in oil pressure at the time of starting the supply of a hydraulic fluid by changing the output oil pressure according to an electric current passed. The second control valve 102 is a normally open solenoid valve connected to the common oil passage 106 at a position between the oil pressure source 100 and the first control valve 101.

In addition, the third control valve 103 is a selector valve by which an individual oil passage 107 communicating with the first hydraulic clutch 59 and an individual oil passage 108 communicating with the second hydraulic clutch 60 are alternatively selectedly connected to the downstream end of the common oil passage 106. When the oil pressure from the oil pressure source 100 acts on a pilot chamber 109 upon opening of the second control valve 102, the third control valve 103 causes the individual oil passage 108 communicating with the second hydraulic clutch 60 to communicate with the common oil passage 106, and causes the individual oil passage 107 communicating with the first hydraulic clutch 59 to communicate with a release oil passage 110. According as the oil pressure in the pilot chamber 109 is released upon closing of the second control valve 102, the third control valve 103 causes the individual oil passage 107 communicating with the first hydraulic clutch 59 to communicate with the common oil passage 106, and causes the individual oil passage 108 communicating with the second hydraulic clutch 60 to communicate with a release oil passage 111.

The fourth control valve 104 is a selector valve for releasing the oil pressure in the release oil passage 110 when the oil pressure in the individual oil passage 108 is high, whereas the fifth control valve 105 is a selector valve for releasing the oil pressure in the release oil passage when the oil pressure in the individual oil passage 107 is high. Besides, the release oil passages 110, 111 are provided at their intermediate portion with discharge ports 112, 113 for gradually releasing the oil pressures in the release oil passages 110, 111 upon closing of the fourth and fifth control valves 104, 105, respectively.

Referring to FIGS. 7 and 8 also, the oil pressure control unit 98 is mounted to an upper part of the crankcase 29, i.e., an upper part of the upper case half 29a, with the first to fifth control valves 101 to 105 stacked vertically in a plurality of layers.

The oil pressure control unit 98 is mounted to an upper part of the crankcase 29 in the condition where a valve housing 114 of the first control valve 101, a valve housing 115 of the second control valve 102, a valve housing 116 of the third control valve 103, and a valve housing 117 provided in common for the fourth and fifth control valves 104, 105 are sequentially stacked in this order from the upper side and connected to each other, and an oil passage 118 for conducting the oil pressure from the oil pressure source 100 in the engine body 11 is connected to the valve housing 115.

In addition, while the cylinder axis CL of the engine body 11 is inclined forwardly upwards, the oil pressure control unit 98 is mounted to an upper part of the crankcase 29 on the opposite side of the inclination direction of the cylinder axis CL, namely, on the rear side of the cylinder block 30.

Moreover, as clearly shown in FIG. 5, the oil pressure control unit 98, the starter motor 47 and the shift motor 80 are concentratedly arranged at an upper part on one side (in this embodiment, the left side) of the crankcase 29 as viewed from a person facing forward with respect to the running direction of the saddle ride type vehicle, whereas the exhaust pipes 24, 25 are disposed on the outer side on the other side of the engine body 11.

Now, operations of this embodiment will be described. The power transmission shaft 81 interlockedly connected to the counter shaft 54 in the gear speed change mechanism 64 and having an axis parallel to the counter shaft 54 is disposed on the lower rear side of the counter shaft 54, and the driven bevel gear 86 fixed to the front and rear wheel drive shaft 12 disposed in the vicinity of the center C of the engine body 11 along the vehicle width direction and extending in the front-rear direction of the vehicle is meshed with the drive bevel gear 85 provided on the power transmission shaft 81 on the rear side of the axis of the power transmission shaft 81 in the engine body 11. Therefore, the interference of the driven bevel gear 86 with the gear speed change mechanism 64 can be obviated while obviating an increase in the size of the engine body and enhancing the degree of freedom in laying out the component parts of the gear speed change mechanism 64.

In addition, a front part of the front and rear wheel drive shaft 12 inserted into the engine 11 forwards from the rear end of the engine body 11 and penetrating the engine body 11 is rotatably borne on the front end of the engine body 11 through the ball bearing 89, the bearing retaining member 93 penetrated by a rear part of the front and rear wheel drive shaft 12 is detachably attached to the engine body 11, and the driven bevel gear 86 relatively non-rotatably fitted to the front and rear wheel drive shaft 12 from the rear end of the front and rear wheel drive shaft 12 is clamped between the ball bearing 92, which is retained by the bearing retaining member 93 in the manner of being interposed between the front and rear wheel drive shaft 12 and the bearing retaining member 93, and the ring-like receiving step part 12a provided at the outer periphery of the front and rear wheel drive shaft 12. Therefore, after the front and rear wheel drive shaft 12 is inserted into the engine body 11, the driven bevel gear 86 can be easily mounted onto the front and rear wheel drive shaft 12.

Further, the gear speed change mechanism 64 includes the reverse gear train GR having the first and second reverse idle gears 69, 70 provided at intermediate parts of a transmission path between the first main shaft 52 and the counter shaft 54, and the axes of rotation of the first and second reverse idle gears 69, 70 are disposed on the front side relative to the power transmission shaft 81. Therefore, the interference of the driven bevel gear 86 with the first and second reverse idle gears 69, 70 can be obviated easily, without making any special contrivance.

In addition, while the oil hydraulic automatic transmission 63 for changing over the change gear ratio by control of an oil pressure is incorporated in the engine body 11, the oil pressure control unit 98 including the first to fifth control valves 101 to 105 for controlling the oil pressure in the oil hydraulic automatic transmission 63 is mounted to an upper portion of the crankcase 29 constituting a part of the engine body 11. Therefore, scattered matters scattered from the ground surface attendant on the running of the saddle ride type vehicle are prevented by the crankcase 29 from colliding upon the oil pressure control unit 98, so that there is no need for a special measure for protection of the oil pressure control unit 98.

Moreover, the oil pressure control unit 98 has the first to fifth control valves 101 to 105 vertically stacked in a plurality of layers, and the oil pressure control unit 98 can be mounted to an upper part of the crankcase 29 in the manner of sequentially mounting them in the order from the lower to the latter layers, whereby mountability of the oil pressure control unit 98 onto the crankcase 29 can be enhanced.

Besides, the cylinder axis CL of the engine body 11 is inclined, and the oil pressure control unit 98 is mounted to an upper part of the crankcase 29 on the opposite side of the inclination direction of the cylinder axis CL. Therefore, the influence of the heat radiation from the cylinder block 30 side can be prevented from being exerted on the oil pressure control unit 98.

In addition, the first and second control valves 101, 102 of the first to fifth control valves 101 to 105 are electrically control valves, and the oil pressure control unit 98, the starter motor 47 and the shift motor 80 are arranged concentratedly at an upper part on one side of the crankcase 29. Therefore, it is possible to contrive concentration and simplification of wiring as well as a reduction in weight. Further, since the exhaust pipes 24, 25 are arranged on the outer side on the other side of the engine body 11, the influence of the heat radiation from the exhaust pipes 24, 25 can be prevented from being exerted on the oil pressure control unit 98, the starter motor 47 and the shift motor 80.

Furthermore, the crankcase 29 is composed of the upper case half 29a and the lower case half 29b coupled to each other so as to be splittable to upper and lower parts, and the oil pressure control unit 98 is mounted to an upper part of the upper case half 29a. Therefore, the oil pressure control unit 98 can be stably mounted to the upper case half 29a, without being limited by the split plane of the crankcase 29.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine for a vehicle with a saddle, comprising:
an engine body mounted on the vehicle, the engine body being mounted on the vehicle with a cylinder block having a cylinder axis (CL) inclined toward a front of the vehicle;
a crankcase having an upper case half and a lower case half coupled to each other,
an oil hydraulic automatic transmission adapted to change over a change gear ratio by control of an oil pressure, the oil hydraulic automatic transmission being incorporated in the engine body; and
an oil pressure control unit including a plurality of control valves adapted to control the oil pressure in the oil hydraulic automatic transmission,
wherein the oil pressure control unit is mounted to a rear portion of an upper surface of the upper case half of the crankcase in a position that is directly behind the cylinder block inclined toward the front of the vehicle, the upper surface of the upper case half being arranged at an obtuse angle (OA) relative to the cylinder axis (CL), and the rear portion of the upper case half being higher than a forward portion of the upper case half,
wherein an exhaust pipe extends rearwardly along a first lateral side of the cylinder block and the oil pressure unit, so that when the vehicle is viewed in an elevation view toward the first lateral side, the exhaust pipe is seen to overlap the oil pressure control unit.

2. The engine for a vehicle with a saddle as set forth in claim 1, further comprising:
a crankshaft extending in a widthwise direction of the vehicle, and
a torque converter mounted on an end of the crankshaft on the first lateral side of the vehicle.

3. The engine for a vehicle with a saddle as set forth in claim 1, wherein the plurality of control valves and other electrical equipment are concentratedly arranged at an upper part on one lateral side of the crankcase, the plurality of control valves being stacked in a plurality of layers in a vertical direction.

4. An engine for a vehicle with a saddle, comprising:
an engine body mounted on the vehicle;
an oil hydraulic automatic transmission adapted to change over a change gear ratio by control of an oil pressure, the oil hydraulic automatic transmission being incorporated in the engine body; and
an oil pressure control unit including a plurality of control valves adapted to control the oil pressure in the oil hydraulic automatic transmission
wherein the oil pressure control unit is mounted to an upper part of a crankcase constituting a part of the engine body,
wherein the oil hydraulic automatic transmission includes:
a gear speed change mechanism having a plurality of speed-stage gear trains capable of being alternatively established between main shafts and a counter shaft which extend in parallel to a vehicle width direction, the gear speed change mechanism being incorporated in the engine body mounted on the vehicle,
a drive bevel gear provided on a power transmission shaft and being interlockedly connected to the counter shaft, and
a driven bevel gear fixed to a front and rear wheel drive shaft disposed in a vicinity of the center (C) of the engine body along the vehicle width direction and extending in a front-rear direction of the vehicle, the drive bevel gear and the driven bevel gear being meshed with each other in the engine body, wherein
the power transmission shaft is interlockedly connected to the counter shaft, has an axis parallel to the counter shaft, and is disposed on the lower rear side of the counter shaft, and the drive bevel gear provided on the power transmission shaft and the driven bevel gear are meshed with each other on a rear side of the axis of the power transmission shaft.

5. The engine for a vehicle with a saddle as set forth in claim 4, wherein a front part of the front and rear wheel drive shaft inserted into the engine body forwards from the rear end of the engine body along the front-rear direction of the vehicle and penetrating the engine body is rotatably mounted on the front end of the engine body along the front-rear direction through a first bearing,
a bearing retaining member penetrated by a rear part of the front and rear wheel drive shaft is detachably attached to the engine body, and
the driven bevel gear relatively non-rotatably fitted to the front and rear wheel drive shaft from the rear end of the front and rear wheel drive shaft is clamped between a second bearing, which is retained by the bearing retaining member so as to be interposed between the front and rear wheel drive shaft and the bearing retaining member, and a ring-like receiving step part provided at the outer periphery of the front and rear wheel drive shaft.

6. The engine for a vehicle with a saddle as set forth in claim 4, wherein the gear speed change mechanism includes the reverse gear train having reverse idle gears provided at intermediate portions of a transmission path between the main shaft and the counter shaft, and
the axes of rotation of the reverse idle gears are disposed on a front side relative to the power transmission shaft.

7. An engine for a four-wheel vehicle, comprising:
an engine body mounted on the vehicle, the engine body being mounted on the vehicle with a cylinder block having a cylinder axis (CL) inclined toward a front of the vehicle;
a crankcase having an upper case half and a lower case half coupled to each other so as to be splittable into upper and lower parts,
an oil hydraulic automatic transmission adapted to change over a change gear ratio by control of an oil pressure, the oil hydraulic automatic transmission being incorporated in the engine body; and
an oil pressure control unit including a plurality of control valves adapted to control the oil pressure in the oil hydraulic automatic transmission;
wherein the oil pressure control unit is mounted to a rear portion of an upper surface of the upper case half of the crankcase in a position that is directly behind the cylinder block inclined toward the front of the vehicle, the upper surface of the upper case half being arranged at an obtuse angle (OA) relative to the cylinder axis (CL), and the rear portion of the upper case half being higher than a forward portion of the upper case half,
wherein a pair of exhaust pipes extends rearwardly along a lateral side of the cylinder block and the oil pressure unit, so that when the vehicle is viewed in an elevation view toward the first lateral side, the exhaust pipe is seen to overlap the oil pressure control unit.

8. The engine for a vehicle with a saddle as set forth in claim 7, wherein the plurality of control valves and other electrical equipment are concentratedly arranged at an upper part on one lateral side of the crankcase, the plurality of control valves stacked in a plurality of layers in a vertical direction.

9. The engine for a vehicle with a saddle as set forth in claim 7, further comprising:
a gear speed change mechanism having a plurality of speed-stage gear trains capable of being alternatively established between main shafts and a counter shaft which extend in parallel to the vehicle width direction, the gear speed change mechanism being incorporated in an engine body mounted on the vehicle,
a drive bevel gear provided on a power transmission shaft and being interlockedly connected to the counter shaft, and
a driven bevel gear fixed to a front and rear wheel drive shaft disposed in the vicinity of the center (C) of the engine body along the vehicle width direction and extending in the front-rear direction of the vehicle, the drive bevel gear and the driven bevel gear being meshed with each other in the engine body, wherein
the power transmission shaft is interlockedly connected to the counter shaft, has an axis parallel to the counter shaft, and is disposed on the lower rear side of the counter shaft, and the drive bevel gear provided on the power transmission shaft and the driven bevel gear are meshed with each other on a rear side of the axis of the power transmission shaft.

10. The engine for a vehicle as set forth in claim 9, wherein a front part of the front and rear wheel drive shaft inserted into the engine body forwards from the rear end of the engine body along the front-rear direction of the vehicle and penetrating the engine body is rotatably mounted on the front end of the engine body along the front-rear direction through a first bearing,
a bearing retaining member penetrated by a rear part of the front and rear wheel drive shaft is detachably attached to the engine body, and
the driven bevel gear relatively non-rotatably fitted to the front and rear wheel drive shaft from the rear end of the front and rear wheel drive shaft is clamped between a second bearing, which is retained by the bearing retaining member so as to be interposed between the front and rear wheel drive shaft and the bearing retaining member, and a ring-like receiving step part provided at the outer periphery of the front and rear wheel drive shaft.

11. The engine for a vehicle as set forth in claim 10, wherein the gear speed change mechanism includes the reverse gear train having reverse idle gears provided at intermediate portions of a transmission path between the main shaft and the counter shaft, and
the axes of rotation of the reverse idle gears are disposed on the front side relative to the power transmission shaft.

12. The engine for a vehicle as set forth in claim 9, wherein the gear speed change mechanism includes the reverse gear train having reverse idle gears provided at intermediate portions of a transmission path between the main shaft and the counter shaft, and
the axes of rotation of the reverse idle gears are disposed on the front side relative to the power transmission shaft.

13. The engine for a four wheel vehicle as set forth in claim 7, further comprising:
a crankshaft extending in a widthwise direction of the vehicle; and
a torque converter mounted on an end of the crankshaft on the first lateral side of the vehicle.

* * * * *